US012744153B2

(12) United States Patent
Ishiguro

(10) Patent No.: US 12,744,153 B2
(45) Date of Patent: Sep. 22, 2026

(54) ISOLATOR

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Akira Ishiguro, Oita Oita (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 1056 days.

(21) Appl. No.: 17/902,516

(22) Filed: Sep. 2, 2022

(65) Prior Publication Data

US 2023/0298809 A1 Sep. 21, 2023

(30) Foreign Application Priority Data

Mar. 16, 2022 (JP) ................................ 2022-041048

(51) Int. Cl.
*H01F 27/32* (2006.01)
*H01F 27/40* (2006.01)
*H01F 38/14* (2006.01)

(52) U.S. Cl.
CPC ............ *H01F 27/32* (2013.01); *H01F 27/40* (2013.01); *H01F 38/14* (2013.01)

(58) Field of Classification Search
CPC .......... H01F 27/32; H01F 27/40; H01F 38/14; H01F 27/324
See application file for complete search history.

(56) References Cited

U.S. PATENT DOCUMENTS 8,279,034 B2 * 10/2012 Kim ...................... H01F 27/326 336/170
10,199,154 B2 * 2/2019 Hong ................. H01F 27/2804
(Continued)

FOREIGN PATENT DOCUMENTS

CN 107256868 A 10/2017
CN 114171868 A 3/2022
(Continued)

OTHER PUBLICATIONS

First Office Action mailed Oct. 30, 2025 in counterpart Chinese Patent Application No. 202210937543.0, with English machine translation, 11 pages.
(Continued)

*Primary Examiner* — Thao P Le
(74) *Attorney, Agent, or Firm* — Kim & Stewart LLP

(57) ABSTRACT

An isolator includes first and second coils, a first insulating film and a primary side conductor. The first coil at a primary side and the second coil at a secondary side are magnetically coupled via the first insulating film. The second coil and the primary side conductor are provided at a front surface side of the first insulating film. The first insulating film includes a plurality of island-shaped convex portions at the front surface side. The island-shaped convex portions are provided between the second coil and the primary side conductor. The island-shaped convex portions provide a creepage distance from the second coil to the primary side conductor along the front surface of the first insulating film. The creepage distance is longer in any direction along the front surface of the first insulating film than a direct distance from the second coil to the primary side conductor.

14 Claims, 8 Drawing Sheets

(56) References Cited

U.S. PATENT DOCUMENTS

| | | | | |
|---|---|---|---|---|
| 10,818,591 | B2 | 10/2020 | Uchida et al. | |
| 11,139,240 | B2 | 10/2021 | Kuwabara et al. | |
| 11,145,597 | B2 | 10/2021 | Kuwabara et al. | |
| 12,580,123 | B2 * | 3/2026 | Liu | H01F 27/366 |
| 2012/0175610 | A1 | 7/2012 | Yamazaki | |
| 2014/0252533 | A1 | 9/2014 | O'Sullivan | |
| 2016/0379746 | A1 * | 12/2016 | Yoshioka | H01F 27/2823 336/220 |
| 2017/0372834 | A1 * | 12/2017 | Kawada | H01F 27/40 |
| 2021/0343641 | A1 | 11/2021 | Kuwabara et al. | |
| 2022/0020525 | A1 * | 1/2022 | Roggendorf | H05K 1/165 |
| 2022/0076990 | A1 * | 3/2022 | Ishiguro | H10W 10/17 |
| 2022/0302569 | A1 * | 9/2022 | Ohguro | H01F 27/324 |
| 2022/0336580 | A1 * | 10/2022 | Yamada | H10D 62/115 |
| 2023/0092162 | A1 * | 3/2023 | Ohguro | H01F 27/324 336/206 |
| 2024/0170205 | A1 * | 5/2024 | Sato | H01F 27/2804 |
| 2024/0331932 | A1 * | 10/2024 | Wada | H01F 27/324 |
| 2024/0429265 | A1 * | 12/2024 | Taylor | H01F 27/2804 |

FOREIGN PATENT DOCUMENTS

| | | | |
|---|---|---|---|
| JP | 2013-152982 | A | 8/2013 |
| JP | 2014022600 | A | 2/2014 |
| JP | 2015-204319 | A | 11/2015 |
| JP | 2018-182223 | A | 11/2018 |
| JP | 2019-062084 | A | 4/2019 |
| JP | 2020-021835 | A | 2/2020 |
| JP | 2020-123599 | A | 8/2020 |
| JP | 2020129598 | A | 8/2020 |
| JP | 2021-174955 | A | 11/2021 |

OTHER PUBLICATIONS

Notice of Reasons for Refusal (Office Action) mailed Mar. 31, 2025 in corresponding Japanese Patent Application No. 2022-041048 with English machine translation, 7 pages.

* cited by examiner

ISOLATOR

CROSS-REFERENCE TO RELATED APPLICATIONS

This application is based upon and claims the benefit of priority from Japanese Patent Application No. 2022-041048, filed on Mar. 16, 2022; the entire contents of which are incorporated herein by reference.

FIELD

Embodiments relate to an isolator

BACKGROUND

There is an isolator including magnetically coupled primary and secondary coils in which signal transmission is performed from the primary side to the secondary side via the magnetic coupling. In such an isolator, it is important to maintain a high dielectric breakdown voltage between the primary side and the secondary side.

DETAILED DESCRIPTION

Figure 1:
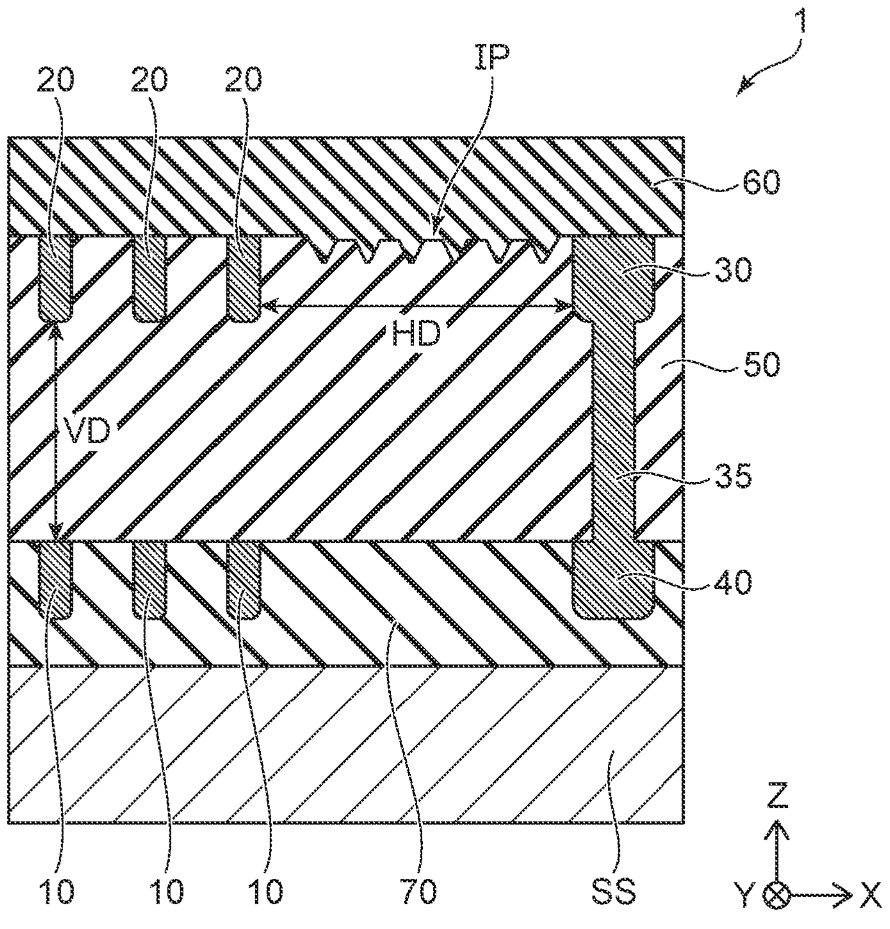
FIG. 1 is a schematic cross-sectional view showing an isolator according to an embodiment.

According to one embodiment, an isolator includes a first coil, a second coil, a first insulating film and a primary side conductor. The first coil being provided at a primary side. The second coil is provided at a secondary side. The second coil is magnetically coupled to the first coil. The first insulating film is provided between the first coil and the second coil. The second coil is provided at a front surface side of the first insulating film. The first coil is provided at a back surface side of the first insulating film. The primary side conductor is provided at the front surface side of the first insulating film. The primary side conductor is apart from the second coil and electrically connected to the primary side. The first insulating film includes a plurality of island-shaped convex portions provided at the front surface side. The plurality of island-shaped convex portions are provided between the second coil and the primary side conductor. The plurality of island-shaped convex portions provides a creepage distance from the second coil to the primary side conductor along the front surface of the first insulating film. The creepage distance is longer in any direction along the front surface of the first insulating film than a direct distance from the second coil to the primary side conductor.

Embodiments will now be described with reference to the drawings. The same portions inside the drawings are marked with the same numerals; a detailed description is omitted as appropriate; and the different portions are described. The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

There are cases where the dispositions of the components are described using the directions of XYZ axes shown in the drawings. The X-axis, the Y-axis, and the Z-axis are orthogonal to each other. Hereinbelow, the directions of the X-axis, the Y-axis, and the Z-axis are described as an X-direction, a Y-direction, and a Z-direction. Also, there are cases where the Z-direction is described as upward and the direction opposite to the Z-direction is described as downward.

FIG. 1 is a schematic cross-sectional view showing an isolator 1 according to the embodiment. The isolator 1 includes a first coil 10 on a primary side, a second coil 20 on a secondary side, and a primary side conductor 30 electrically connected to a primary side circuit including the first coil 10. The isolator 1 transmits a signal from the primary side to the secondary side via magnetic coupling between the first coil 10 and the second coil 20. The first coil 10 and the second coil 20 are, for example, planar spiral coils (see FIG. 3).

The primary side conductor 30 is provided at the same level as a level of the second coil 20 in a direction directed from the first coil 10 toward the second coil 20, for example, in a Z-direction. The primary side conductor 30 serves as, for example, an external terminal for supplying a reference potential to the primary side circuit.

As shown in FIG. 1, the isolator 1 further includes another primary side conductor 40, a first insulating film 50, a second insulating film 60, a third insulating film 70, and a semiconductor substrate SS. The semiconductor substrate SS is, for example, silicon. The first insulating film 50, the second insulating film 60, and the third insulating film 70 are stacked on the semiconductor substrate SS.

The primary side conductor 40 is provided at the same level as a level of the first coil 10 in the Z-direction. The primary side conductor 40 is electrically connected to the first coil 10 via, for example, a wiring (not shown) or a circuit (see FIG. 7). The primary side conductor 40 is electrically connected to the primary side conductor 30 on a front surface side via a connection conductor 35.

The first insulating film 50 is provided on the first coil 10. The first insulating film 50 is, for example, a silicon oxide film. The first insulating film 50 is provided between the first coil 10 and the second coil 20. The first coil 10 is provided at, for example, a back surface side of the first insulating film 50. The second coil 10 is provided at, for example, a front surface side of the first insulating film 50. The second coil 20 and the primary side conductor 30 are provided at the front surface side of the first insulating film 50, and apart from each other.

The first insulating film 50 has a film thickness capable of electrically insulating the second coil 20 from the first coil 10. The first insulating film 50 provides a desired dielectric breakdown voltage between the first coil 10 and the second coil 20. The first insulating film 50 extends between the primary side conductor 30 and the primary side conductor 40. The connection conductor 35 is, for example, a contact plug extending in the first insulating film 50. The connection conductor 35 is, for example, a conductor including a metal such as copper.

The second coil 20 is provided on the first insulating film 50 at a side opposite to the first coil. The second coil 20 is embedded in, for example, the first insulating film 50. The second coil 20 is, for example, a conductor including a metal such as copper.

The second insulating film 60 is provided on the first insulating film 50. The second insulating film 60 covers the second coil 20 and the primary side conductor 30. The second insulating film 60 is, for example, a silicon oxide film. The second insulating film 60 may be different in a composition from the first insulating film 50.

The third insulating film 70 is provided between the semiconductor substrate SS and the first insulating film 50. The third insulating film 70 is, for example, a silicon oxide film. The first coil 10 and the primary side conductor 40 are embedded in the third insulating film 70. The first coil 10 and the primary side conductor 40 are provided between the first insulating film 50 and the third insulating film 70. The first coil 10 and the primary side conductor 40 are, for example, conductors including a metal such as copper.

As shown in FIG. 1, the first coil 10 and the primary side circuit (not shown) are electrically insulated from the second coil at the secondary side by the first insulating film 50. The dielectric breakdown voltage between the primary side and the secondary side is ensured by increasing a distance VD from the first coil 10 to the second coil 20 and a direct distance HD from the primary side conductor 30 to the second coil 20.

When an interface of low electrical resistance is provided between the first insulating film 50 and the second insulating film 60, however, the dielectric breakdown voltage decreases between the primary side and the secondary side. For example, when a foreign substance due to the manufacturing process or mobile ions exists between the first insulating film 50 and the second insulating film 60, the dielectric breakdown voltage decreases between the primary side and the secondary side. Moreover, there may be a defect such as an initial deposition material in the process of forming the second insulating film 60, which reduces the dielectric breakdown voltage.

For example, an insulating film formed using chemical vapor deposition (CVD) includes the initial deposition material having a thickness of about several tens nanometers (nm). Such an initial deposition material may be different in the composition and crystallinity from the insulating film and reduce the dielectric breakdown voltage. The initial deposition layer including such material is confirmed by, for example, a contrast in the cross-sectional TEM image (Transmission Electron Microscope image) of the insulating film.

In the isolator 1 according to the embodiment, multiple island-shaped convex portions IP are provided between the second coil 20 and the primary side conductor 30. The island-shaped convex portions IP are provided, for example, at the front surface side of the first insulating film 50. The island-shaped convex portions IP provides a creepage distance from the second coil 20 to the primary side conductor 30 along the front surface of the first insulating film 50. Thus, by providing the creepage distance longer than the direct distance HD from the second coil to the primary side conductor 30, it is possible to increase the electrical resistance at the interface between the first insulating film 50 and the second insulating film 60.

Figure 2:
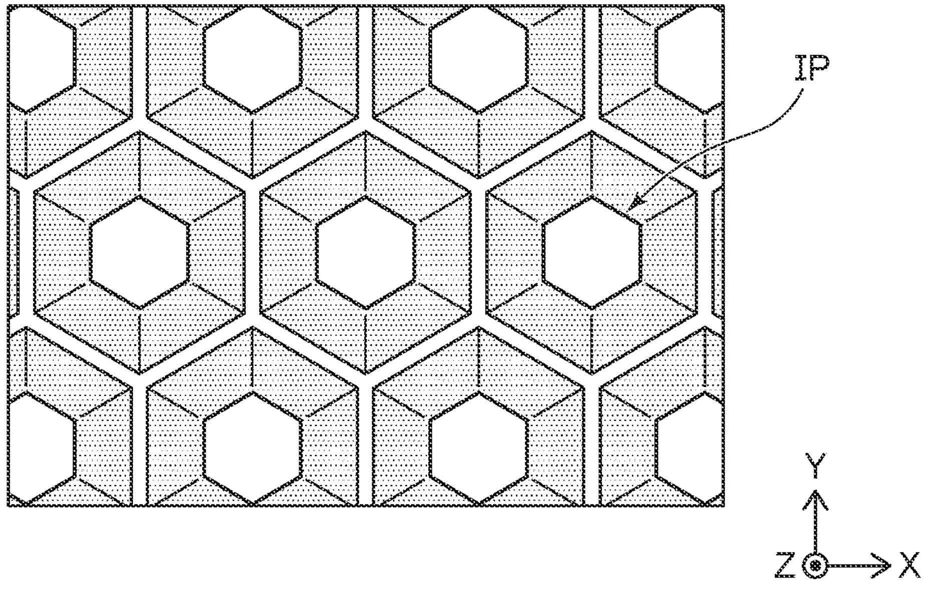
FIG. 2 is a schematic view showing the isolator 1 according to the embodiment.

FIG. 2 is a schematic view showing the isolator 1 according to the embodiment. FIG. 2 is a schematic plan view showing the island-shaped convex portions IP and an arrangement thereof in a plane parallel to a boundary between the first insulating film 50 and the second insulating film 60.

As shown in FIG. 2, each of the island-shaped convex portions IP has a planar shape of, for example, regular hexagonal. By providing the island-shaped convex portions IP adjacent to each other with the closest distance, the planar filling is achieved in a region in which the multiple island-shaped convex portions are provided. In the embodiment, the planar shape of the island-shaped convex portions IP is not limited to the example. For example, a polygonal shape or a circular shape other than the regular hexagonal shape can be applied thereto.

Figure 3:
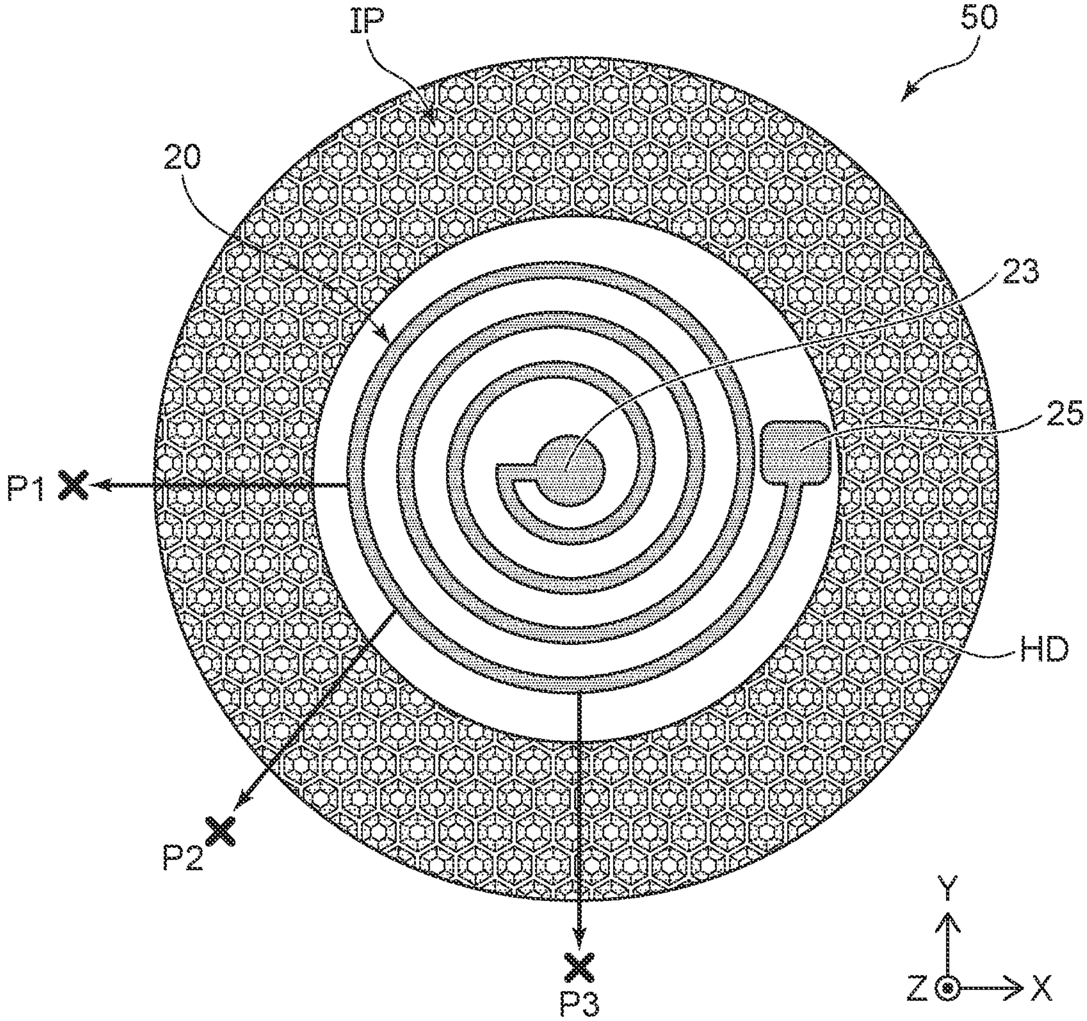
FIG. 3 is a schematic plan view showing the isolator according to the embodiment.

FIG. 3 is a schematic plan view showing the isolator 1 according to the embodiment. FIG. 3 is a schematic view showing the front surface of the first insulating film 50.

As shown in FIG. 3, the second coil 20 is the planar spiral coil. The second coil 20 has a connection pad 23 and a connection pad 25 at both ends thereof. The second coil 20 is electrically connected to, for example, an external circuit or another secondary side coil via a metal wire bonded to the connection pad 23 and the connection pad 25. The first coil 10 is also the planar coil, and has the same shape as a planer shape of the second coil 20 below the second coil 20. The planar shape of the second coil 20 is not limited to a circular shape, and may be, for example, a polygonal shape.

The multiple island-shaped convex portions IP, for example, are provided to surround the second coil 20. The primary side conductor 30 may be provided at any position such as P1, P2 or P3 outside the area in which the island-shaped convex portions IP are provided. The island-shaped convex portions IP provide the creepage distance from the second coil 20 to any one of the positions P1 to P3 longer than the direct distance HD therebetween. That is, as shown by arrows in FIG. 3, in any direction along the front surface of the first insulating film 50, the creepage distance from the second coil 20 to each position of P1, P2 and P3 is longer than the direct distance HD. Moreover, the primary side conductor 30 may be provided to surround the second coil 20 (see FIG. 6).

Figure 4A:
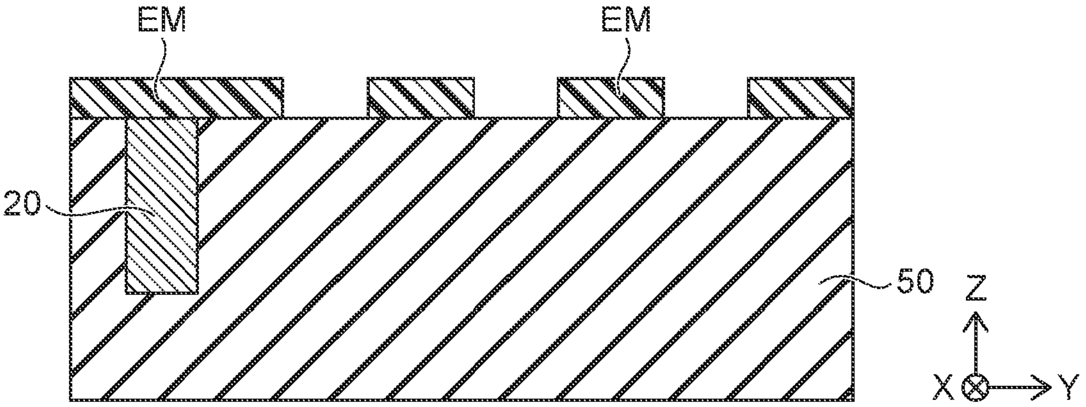
FIGS. 4A to 4C are schematic cross-sectional views showing a manufacturing process of the isolator according to the embodiment.
Figure 4B:
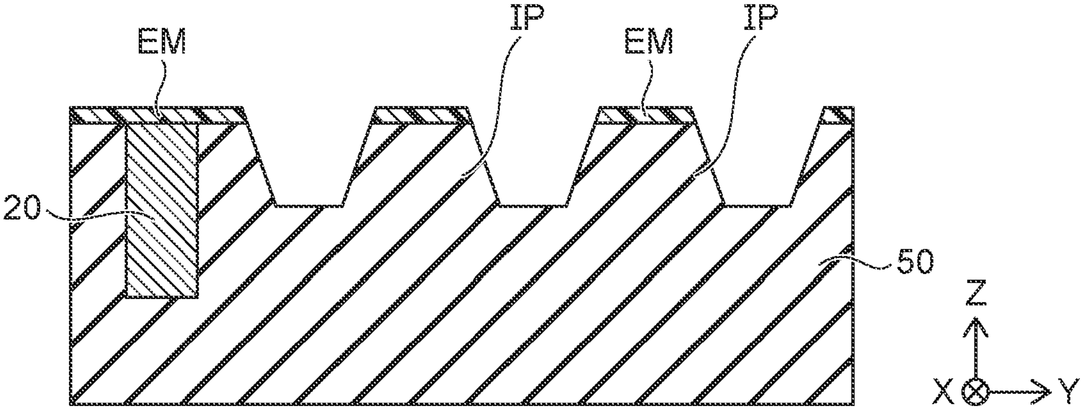
Figure 4C:
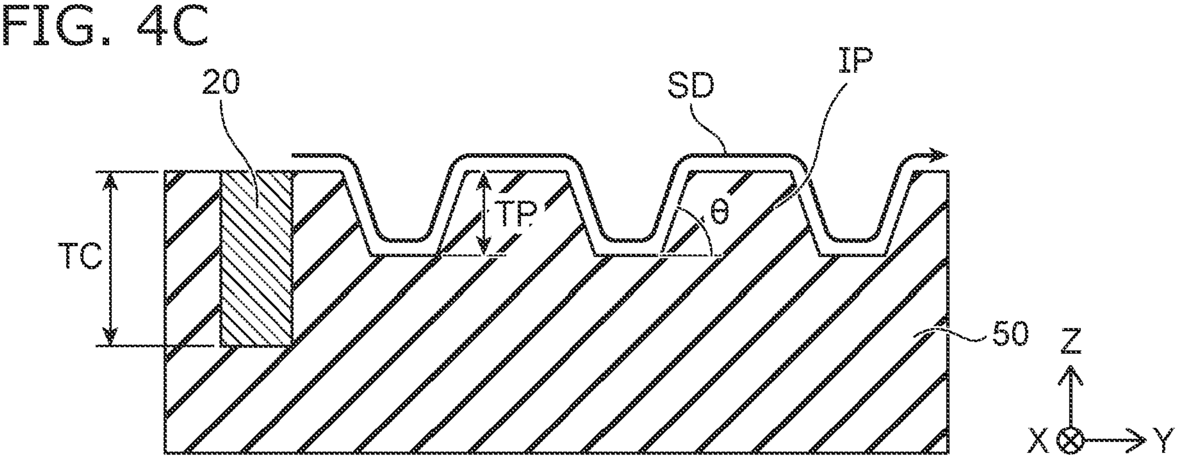

FIGS. 4A to 4C are schematic cross-sectional views showing manufacturing processes of the isolator according to the embodiment. FIGS. 4A to 4C are schematic views illustrating the processes of forming the island-shaped convex portions.

As shown in FIG. 4A, an etching mask EM is formed on the front surface of the first insulating film 50 after the second coil is formed in the first insulating film 50. The primary side conductor 30 is also formed in the first insulating film 50 (not shown).

The etching mask EM is, for example, a photoresist. The etching mask EM is formed by, for example, photolithography pattering. In the area where the island-shaped convex portions IP are formed, the etching mask EM is shaped into, for example, a regular hexagonal.

As shown in FIG. 4B, the first insulating film 50 is selectively etched to form the island-shaped convex portions IP. The first insulating film 50 is selectively removed by, for example, dry etching. During this process, the etching mask EM is also etched, and the island-shaped convex portions IP each are shaped with, for example, inclined side surfaces.

As shown in FIG. 4C, the etching mask EM is removed. The etching mask EM is removed by, for example, ashing. The island-shaped convex portions IP each have a height, for example, lower than a thickness TC in the Z-direction of the second coil 20. The island-shaped convex portions IP are provided with an inclination angle θ of the side surface with respect to a plane including bottom surfaces between the adjacent island-shaped convex portions IP. The inclination angle θ of the side surface is, for example, larger than 45°. Thus, the creepage distance SD along the surface of the first insulating film 50 can be increased.

A method for manufacturing the island-shaped convex portions IP is not limited to the example described above. For example, fine convex portions of island-shape may be formed by roughening the front surface of the first insulating film 50. For example, atypical random unevenness is formed in the front surface of the insulating film 50 by liquid phase etching or the like. Such an unevenness includes, for example, a step of several hundred nm, and the convex portions preferably have the area ratio of about 50%. Moreover, an unevenness including a step of several tens nm is also effective, and a superior dielectric breakdown voltage can be achieved in combination with the adhesion improvement described later.

Figure 5A:
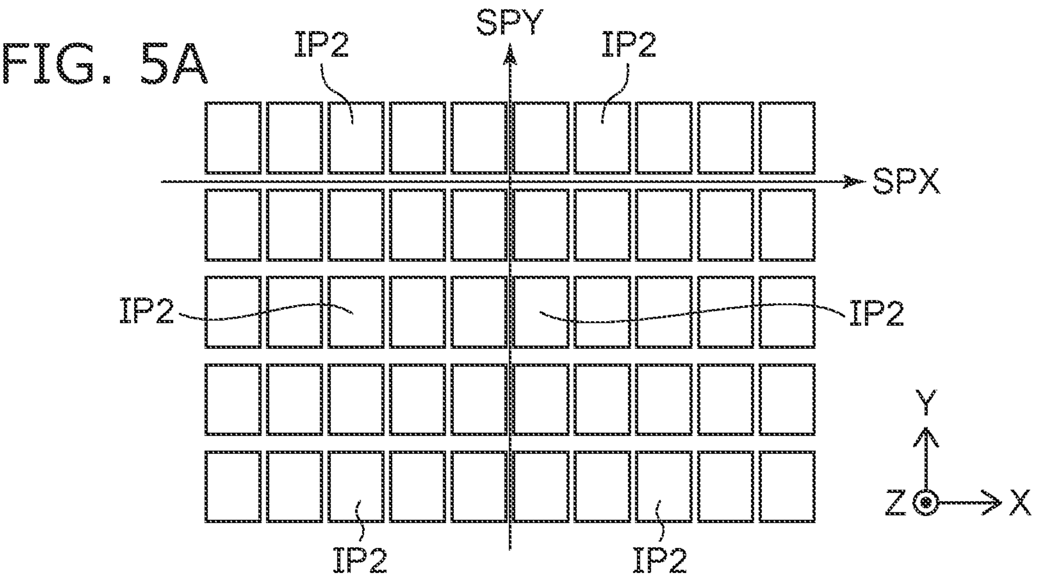
FIGS. 5A to 5C are schematic plan views showing a structure of an isolator according to a variation of the embodiment.
Figure 5B:
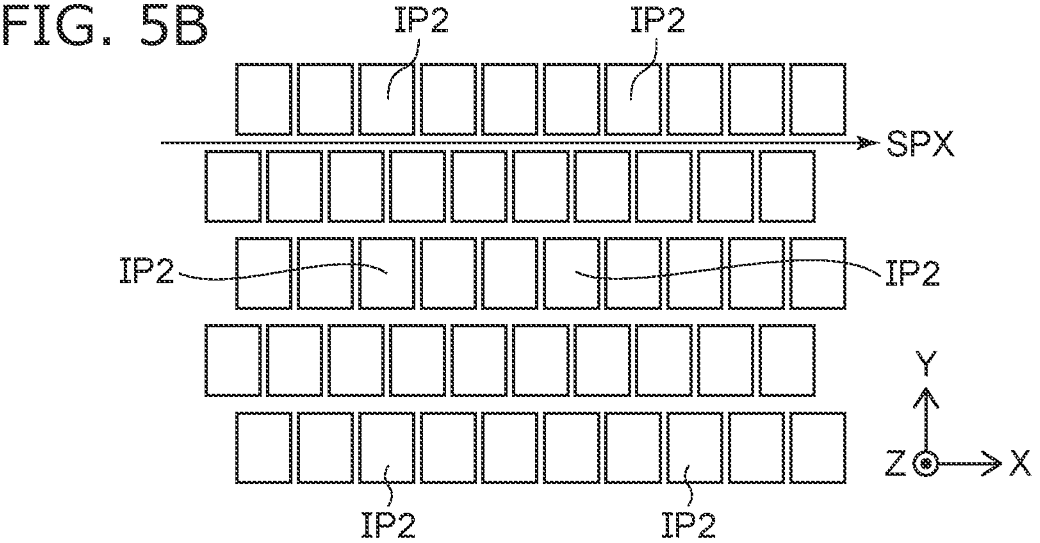
Figure 5C:
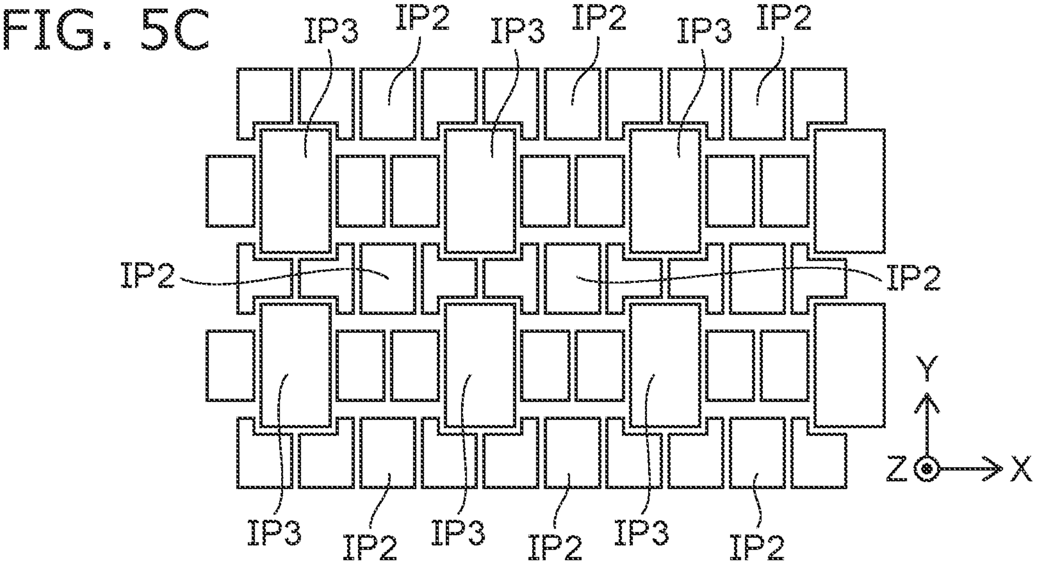

FIGS. 5A to 5C are schematic plan views showing an isolator according to a variation of the embodiment. FIGS. 5A and 5B are schematic views showing an example arrangement of island-shaped convex portions IP according to a comparative example. FIG. 5C is a schematic view showing an example arrangement of island-shaped convex portions IP according to the variation of the embodiment.

In the example shown in FIG. 5A, the island-shaped convex portions IP2 each having a planar shape of rectangle are provided. The multiple island-shaped convex portions IP2 are arranged evenly spaced apart in, for example, the X-direction and the Y-direction. Therefore, the linear short-circuit paths SPX and SPY is provided respectively in the X-direction and the Y-direction between the adjacent island-shaped convex portions IP2. The short-circuit paths SPX and SPY do not intersect any one of the island-shaped convex portions IP2. Therefore, the creepage distance along the short-circuit paths SPX and SPY is the same as the direct distance HD.

In the example shown in FIG. 5B, the island-shaped convex portions IP2 are arranged with a periodical phase shift of the X-direction alignments. That is, the island-shaped convex portions IP2 are arranged such that arrangement periods in the X-direction of the island-shaped convex portions IP2 are alternately shifted in the Y-direction. Thus, the short-circuit paths SPY in the Y-direction disappear, and the short-circuit path SPX in the X-direction remains.

As shown in FIG. 5C, the island-shaped convex portions IP3 may be provided with a rectangular shape of different size. That is, the island-shaped convex portions IP3 with a larger size in the Y-direction are added to the arrangement of the island-shaped convex portions IP2 shown in FIG. 5B. Thereby, the short-circuit paths SPX in the X-direction also disappear.

As described above, by providing the multiple island-shaped convex portions IP with a polygonal planar shape of different size, it is possible to achieve an arrangement in which the creepage distance is longer than the direct distance HD in any direction.

Figure 6:
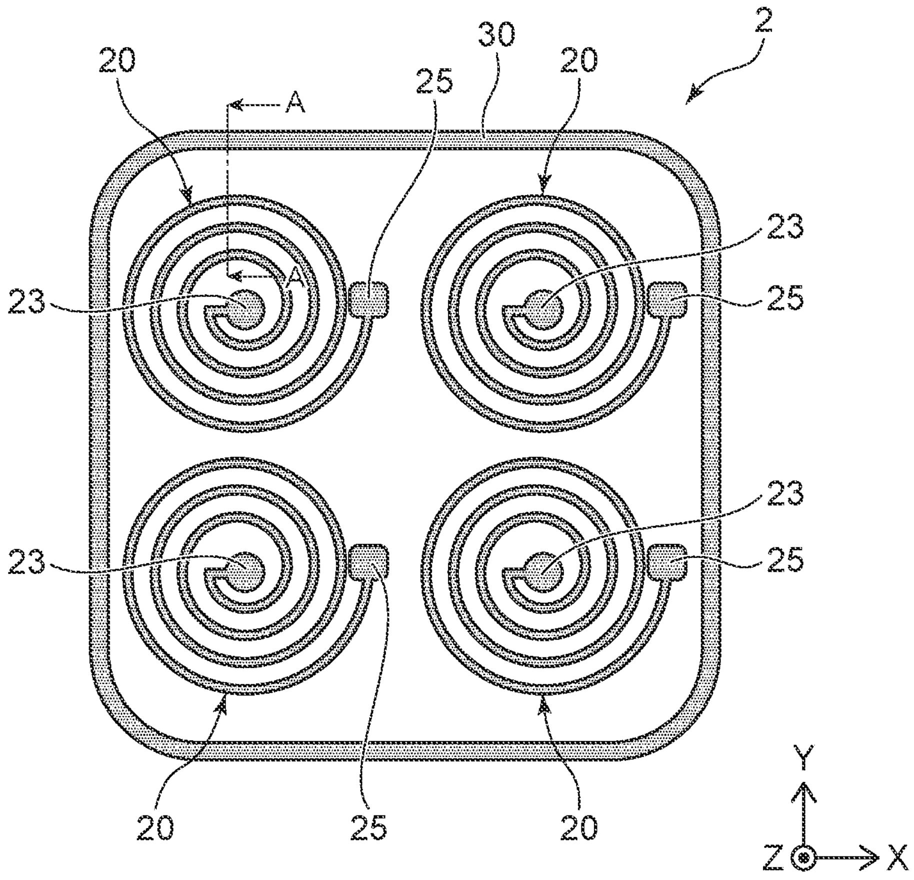
FIG. 6 is a schematic plan view showing an isolator according to other variation of the embodiment.

FIG. 6 is a schematic plan view showing an isolator 2 according to another variation of the embodiment. FIG. 6 is a schematic view showing the front surface of the first insulating film 50. In the example, multiple second coils 20 are provided on the secondary side. The multiple second coils 20 are connected, for example, in series via a metal wire (not shown). Moreover, the multiple second coils 20 are magnetically coupled respectively to multiple first coils 10 provided below. The second coils 20 may be configured such that the respective coils are connected to each other at outermost peripheries thereof, and may have the same winding direction or a reverse winding direction from each other.

The four second coils 20 are shown in FIG. 6, but are not limited thereto. Any number of the second coils 20 may be provided on the secondary side, and at least two second coils 20 are provided.

As shown in FIG. 6, the primary side conductor 30 is provided to surround the multiple second coils 20. The multiple island-shaped convex portions IP (not shown) are provided between the primary side conductor 30 and each of the second coils 20 (see FIG. 3). The island-shaped convex portions IP are provided such that the creepage distance from each of the second coils 20 to the primary side conductor 30 is longer than a direct distance therebetween in any direction.

Figure 8:
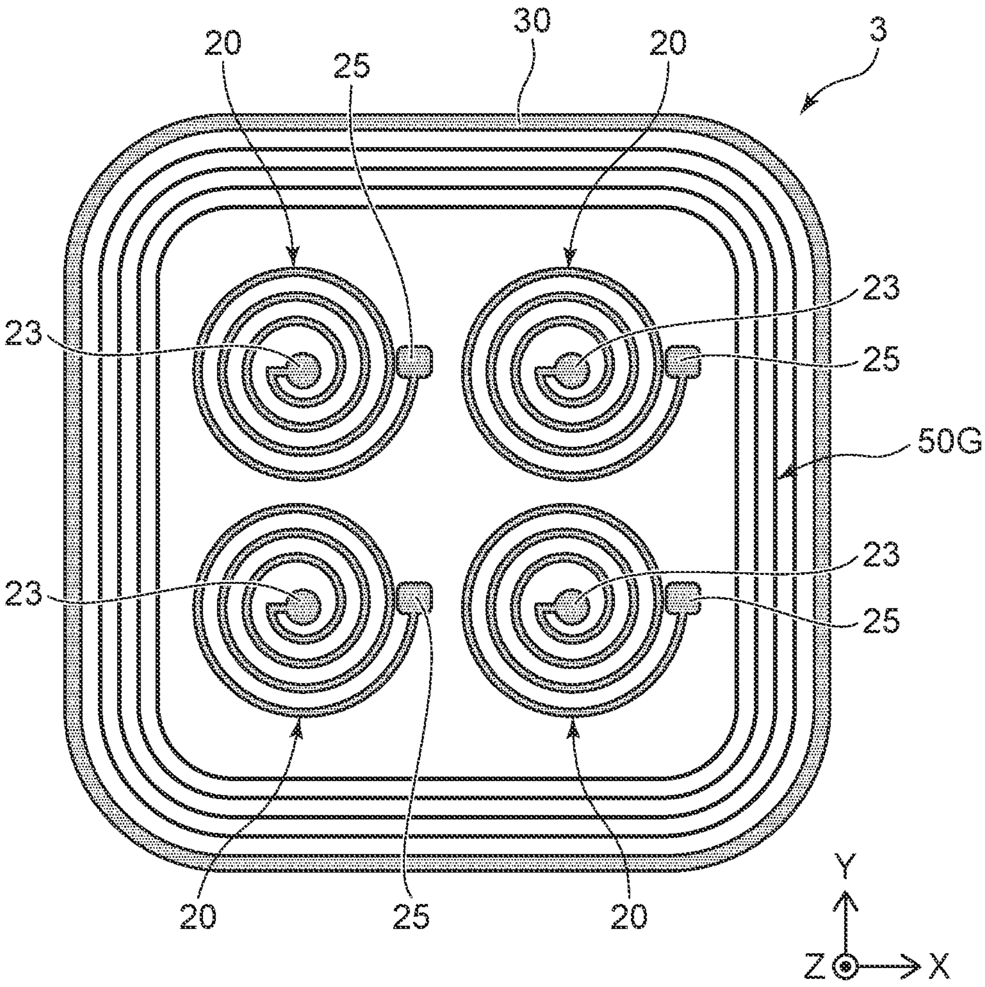
FIG. 8 is a schematic plan view showing an isolator according to a comparative example.

For example, FIG. 8 is a schematic plan view showing an isolator 3 according to a comparative example. In the isolator 3, multiple grooves 50G are provided on the front surface side of the first insulating film 50. The multiple grooves 50G are provided between each of the multiple second coils 20 and the primary side conductor 30. The multiple grooves 50G surround the multiple second coils 20. Even in such a configuration, the creepage distance from each of the second coils 20 to the primary side conductor 30 can be longer than the direct distance HD. In order to provide the multiple grooves 50G between each of the second coils 20 and the primary side conductor 30, however, a larger area is required therebetween.

In the isolator 2 according to the embodiment, the multiple island-shaped convex portions IP can be provided without increasing a space between each of the second coils 20 and the primary side conductor 30. Moreover, the arrangement of the island-shaped convex portions IP does not depend on respective shapes and arrangements of the second coils 20 and the primary side conductor 30. That is, the island-shaped convex portions IP according to the embodiment are suitable for miniaturization of the isolator 2 and have a large degree of flexibility in the arrangement.

Figure 7:
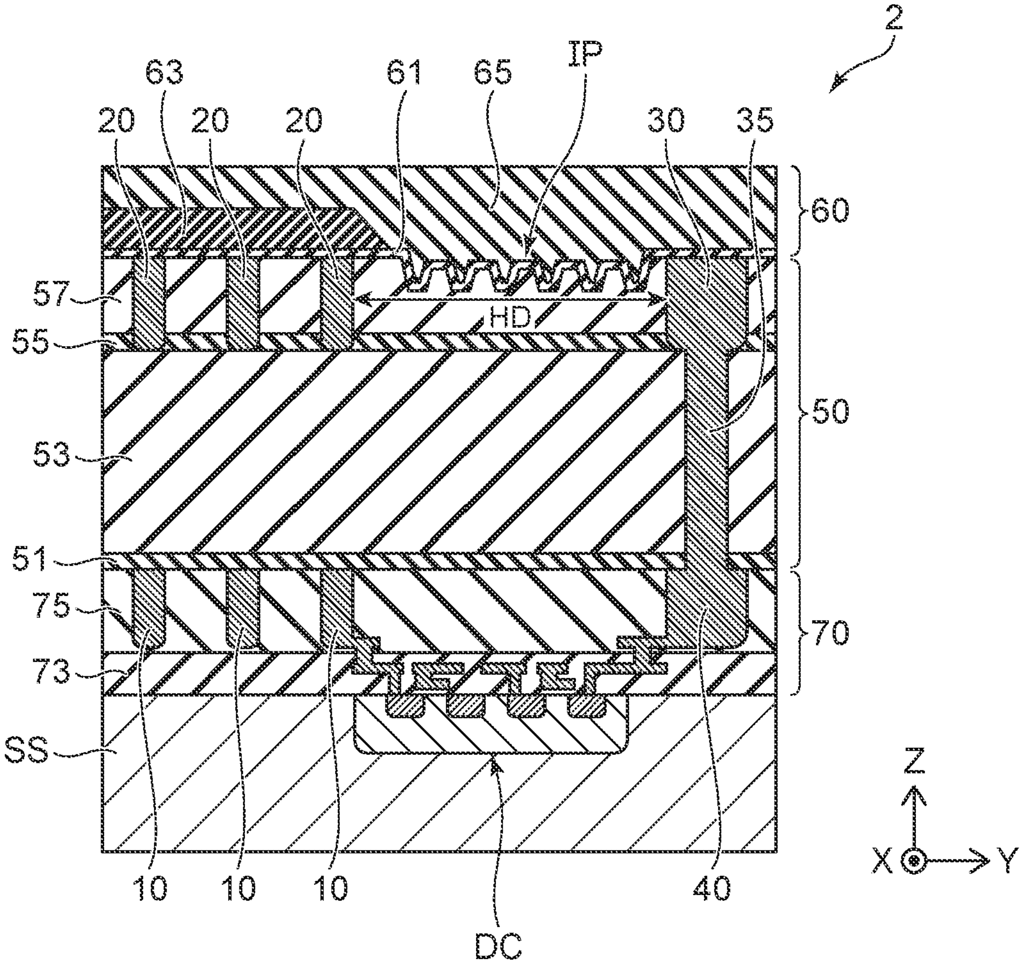
FIG. 7 is a schematic cross-sectional view showing the isolator according to the other variation of the embodiment.

FIG. 7 is a schematic cross-sectional view showing the isolator 2 according to the variation of the embodiment. FIG. 7 is a cross-sectional view along A-A line shown in FIG. 6.

As shown in FIG. 7, the first insulating film 50 has a stacked structure including a first film 51, a second film 53, a third film 55, and a fourth film 57. The second insulating film 60 includes a first film 61, a second film 63, and a third film 65. The third insulating film 70 includes a first film 73 and a second film 75.

The first film 51 of the first insulating film 50 is, for example, a silicon carbonitride film (SiCN film) formed using plasma enhanced chemical vapor deposition (PCVD). The first film 51 is provided on the third insulating film 70. The first film 51 prevents metal atoms of the first coil 10 and the primary side conductor 40 from diffusing into the first insulating film 50.

The second film 53 is, for example, a silicon oxide film formed using chemical vapor deposition (CVD). The second film 53 is provided on the first film 51. The second film 53 is provided between the first coil 10 and the second coil 20, and has a film thickness capable of ensuring a dielectric breakdown voltage therebetween. The second film 53 has a film thickness of, for example, 5 micrometers or more in the Z-direction.

The third film 55 is, for example, a silicon nitride film formed using PCVD. The third film 55 is provided on the second film 53. Further, the fourth film 57 is provided on the third film 55. The fourth film 57 is, for example, a silicon oxide film formed using PCVD.

The second coil 20 is provided in the fourth film 57. In a process of forming the second coil 20, the third film 55 serves as an etching stop film. That is, when a groove for embedding the second coil 20 and the primary side conductor 30 is formed in the fourth film 57, the third film 55 prevents excessive etching so that the groove does not reach the second film 53.

The first film 61 of the second insulating film 60 is provided on the first insulating film 50. The first film 61 is, for example, a SiCN film. The first film 61 prevents diffusion of metal atoms of the second coil 20 and the primary side conductor 30.

The second film 63 is provided on the first film 61. The second film 63 is, for example, a silicon oxide film formed using CVD. The second film 63 is formed to cover the second coil 20.

The third film 65 is provided on the second film 63 and the first film 61. The third film 65 is provided between the second coil 20 and the primary side conductor 30. The third film 65 is in contact with the first film 61. The third film 65 is, for example, a silicon oxide film formed using PCVD.

The first film 73 of the third insulating film 70 is provided on the semiconductor substrate SS. The first film 73 is, for example, a silicon oxide film formed using CVD. The first film 73 is formed as an interlayer insulating film.

The second film 75 is provided on the first film 73. The second film 75 is, for example, a silicon oxide film formed using PCVD. The first coil 10 and the primary side conductor 40 are provided in the second film 75.

As shown in FIG. 7, the isolator 2 further includes a drive circuit DC. The drive circuit DC controls the operation of the first coil 10. The drive circuit DC is provided on a front surface side of the semiconductor substrate SS. The first film 73 of the third insulating film 70 includes a multilayer wiring of the drive circuit DC. The primary side conductor 40, for example, is electrically connected to the first coil 10 via the drive circuit DC.

In the isolator 2, the island-shaped convex portions IP are provided on a front surface of the fourth film 57 of the first insulating film 50. Therefore, the creepage distance can be made longer than the direct distance HD respectively at an interface between the fourth film 57 of the first insulating film 50 and the first film 61 of the second insulating film 60 and an interface between the first and third films 61 and 65 of the second insulating film 60. Accordingly, a dielectric breakdown voltage can be increased between the second coil 20 and the primary side conductor 30.

Further, by improving adhesion strength at the interface between the fourth film 57 of the first insulating 50 and the first film 61 of the second insulating film 60, it is possible in a temperature cycle test (TCT) to disperse the stress due to a sealing resin. In other words, the interface stability can be ensured by improving the adhesion strength in combination with the increased creepage distance by the multiple convex portions. That is, a linear expansion coefficient of the first film 61 of the second insulating film 60 can be smaller than linear expansion coefficients of the third film 65 of the second insulating film and the fourth film 57 of the first insulating film 50. The film thickness of the first film 61 of the second insulating film 60 can be thinner than the film thickness of the third film 65 of the second insulating film 60 and the film thickness of the fourth film 57 of the first insulating film 50. Therefore, the stress relaxation is advantageously achieved at the interfaces between the fourth film 57 of the first insulating film 50 and the first film 61 of the second insulating film 60 and between the first film 61 of the second insulating film 60 and the third film 65 of the second insulating film 60. That is, a thin film such as the first film 61 of the second insulating film 60 is sandwiched between thick films such as the fourth film 57 of the first insulating film 50 and the third film 65 of the second insulating film 60, and the thick films have a linear expansion coefficient different from a linear expansion coefficient of the thin film. Thereby, it is possible to obtain a higher dielectric breakdown voltage by the improved adhesion strength in combination with the increased creepage distance by the multiple convex portions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An isolator comprising:

a first coil at a primary side;

a second coil at a secondary side, the second coil being magnetically coupled to the first coil;

a first insulating film provided between the first coil and the second coil, the second coil being provided at a front surface side of the first insulating film, the first coil being provided at a back surface side of the first insulating film; and a primary side conductor provided at the front surface side of the first insulating film, the primary side conductor being apart from the second coil and electrically connected to the primary side, the first insulating film including a plurality of island-shaped convex portions being provided at the front surface side, the plurality of island-shaped convex portions being provided between the second coil and the primary side conductor, the plurality of island-shaped convex portions providing a creepage distance from the second coil to the primary side conductor along the front surface of the first insulating film, the creepage distance being longer in any direction along the front surface of the first insulating film than a direct distance from the second coil to the primary side conductor.

2. The isolator according to claim 1, wherein the plurality of island-shaped convex portions surround the secondary coil.

3. The isolator according to claim 1, further comprising:

multiple pairs of the first coil and the second coil, wherein the primary side conductor surrounds a plurality of the second coils.

4. The isolator according to claim 1, wherein the plurality of island-shaped convex portions provided with a planar shape of polygon along the front surface of the first insulating film, the plurality of island-shaped convex portions include an island-shaped convex portion being different in size from other island-shaped convex portions.

5. The isolator according to claim 1, wherein the plurality of island-shaped convex portions each have a hexagonal planar shape along the front surface of the first insulating film, and are arranged to be closest to each other.

6. The isolator according to claim 1, wherein the first insulating film includes first and second films, the first film being provided between the first coil and the second coil,
the second film being provided on the first film, and
the second coil is provided in the second film.

7. The isolator according to claim 1, further comprising:
a second insulating film covering the primary side conductor and the second coil.

8. The isolator according to claim 7, wherein
the second insulating film includes first to third films, the first film being provided on the first insulating film, the second and third films being provided on the first film, the second film being provided between the first film and the third film;
the first film of the second insulating film being different in a composition from the first insulating film; and
the second and third films of the second insulating film has a composition same as the composition of the first insulating film.

9. The isolator according to claim 8, wherein
the second film of the second insulating film is provided on the second coil, and the first film of the second insulating film provided between the second coil and the second film of the second insulating film.

10. The isolator according to claim 8, wherein
the first film of the second insulating film is provided on the plurality island-shaped convex portions, and
the third film of the second insulating film covers the plurality island-shaped convex portions with the first film of the second insulating film interposed.

11. The isolator according to claim 1, wherein
the island-shaped convex portion has a height in a first direction smaller than a thickness in the first direction of the second coil, the first direction being directed from the first coil toward the second coil.

12. The isolator according to claim 1, further comprising:
a semiconductor substrate; and
a third insulating film provided on the semiconductor substrate, wherein
the third insulating film is provided between the semiconductor substrate and the first insulating film, and
the first coil is provided in the third insulating film.

13. The isolator according to claim 12, further comprising:
a drive circuit provided between the semiconductor substrate and the third insulating film, the drive circuit being provided on the semiconductor substrate, wherein
the first coil and the primary side conductor are electrically connected to the drive circuit.

14. The isolator according to claim 1, wherein
the primary side conductor is configured to supply a reference potential of the primary side.

* * * * *